(12) United States Patent
Sun et al.

(10) Patent No.: US 12,254,636 B2
(45) Date of Patent: Mar. 18, 2025

(54) INSTANCE SEGMENTATION METHOD AND APPARATUS

(71) Applicant: HUAWEI TECHNOLOGIES CO., LTD., Guangdong (CN)

(72) Inventors: Kunyang Sun, Nanjing (CN); Hao Chen, Nanjing (CN); Chunhua Shen, Adelaide (AU); Youliang Yan, Shenzhen (CN); Bin Shao, Shenzhen (CN); Songcen Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 17/853,799

(22) Filed: Jun. 29, 2022

(65) Prior Publication Data

US 2022/0335619 A1  Oct. 20, 2022

Related U.S. Application Data

(63) Continuation of application No. PCT/CN2020/142438, filed on Dec. 31, 2020.

(30) Foreign Application Priority Data

Dec. 31, 2019 (CN) .......................... 201911418245.5

(51) Int. Cl.
  *G06T 7/12* (2017.01)
  *G06T 3/40* (2006.01)

(52) U.S. Cl.
  CPC .................. *G06T 7/12* (2017.01); *G06T 3/40* (2013.01); *G06T 2207/20081* (2013.01); *G06T 2207/20084* (2013.01)

(58) Field of Classification Search
  CPC ... G06T 7/12; G06T 3/40; G06T 2207/20081; G06T 2207/20084; G06V 10/26; G06V 10/82
  See application file for complete search history.

(56) References Cited

U.S. PATENT DOCUMENTS

2012/0099771 A1    4/2012  Lao
2018/0253622 A1*   9/2018  Chen .................. G06N 3/08
                           (Continued)

FOREIGN PATENT DOCUMENTS

CN    106651877 A    5/2017
CN    108345887 A    7/2018
                    (Continued)

OTHER PUBLICATIONS

He et al., "Mask R-CNN," Proceedings of the IEEE International Conference on Computer Vision (ICCV), Mar. 2017, 9 pages.
(Continued)

*Primary Examiner* — Daniel G Mariam
(74) *Attorney, Agent, or Firm* — Fish & Richardson P.C.

(57) ABSTRACT

An instance segmentation method and apparatus are provided. A to-be-trained segmentation network performs the following processing on each instance group that is in a sample original image and that is of pixels of a marked instance, where each instance group includes at least one marked instance, and the processing includes: predicting at least two different first basic feature maps and a first attention feature map corresponding to each first basic feature map; performing weighted processing on the at least two first basic feature maps and pixel values of respective first attention feature maps corresponding to the at least two first basic feature maps, to obtain a first feature fusion map; and training the to-be-trained segmentation network based on the first feature fusion map and the sample original image. A segmentation model can precisely determine pixels of an instance in an original image.

18 Claims, 7 Drawing Sheets

(56) References Cited

U.S. PATENT DOCUMENTS

2019/0057507 A1* 2/2019 El-Khamy .............. G06T 11/60
2020/0356854 A1 11/2020 Li et al.

FOREIGN PATENT DOCUMENTS

| CN | 109447169 A | 3/2019 |
|----|-------------|--------|
| CN | 109584248 A | 4/2019 |
| CN | 109902622 A | 6/2019 |
| CN | 109902702 A | 6/2019 |
| CN | 110163207 A | 8/2019 |
| CN | 110532955 A | 12/2019 |
| CN | 111192277 A | 5/2020 |

OTHER PUBLICATIONS

Bolya et al., "YOLACT Real-Time Instance Segmentation," Proceedings of the IEEE/CVF International Conference on Computer Vision (ICCV), Apr. 2019, 10 pages.
International Search Report and Written Opinion in International Appln. No. PCT/CN2020/142438, mailed on Mar. 30, 2021, 18 pages (with English translation).

* cited by examiner

INSTANCE SEGMENTATION METHOD AND APPARATUS

CROSS-REFERENCE TO RELATED APPLICATIONS

This application is a continuation of International Application No. PCT/CN2020/142438, filed on Dec. 31, 2020, which claims priority to Chinese Patent Application No. 201911418245.5, filed on Dec. 31, 2019. The disclosures of the aforementioned applications are hereby incorporated by reference in their entireties.

TECHNICAL FIELD

Embodiments of this application relate to the field of computer vision technologies, and in particular, to an instance segmentation method and apparatus.

BACKGROUND

An image segmentation (image segmentation) technology is an important part of image semantic understanding. Currently, image segmentation tasks include semantic segmentation (semantic segmentation) and instance segmentation (instance segmentation). Semantic segmentation is to classify instances in an image into corresponding categories, for example, a person, a cat, and a dog, without distinguishing between different instances of a same category. For example, when there are a plurality of cats in an image, through semantic segmentation, all pixels of the plurality of cats are predicted as a category "cat". Instance segmentation further needs to distinguish different instances based on a specific category, for example, distinguish which pixels belong to a first cat and which pixels belong to a second cat.

As videos and images on mobile terminals are more widely used, instance segmentation becomes increasingly necessary, and is an indispensable technology in portrait photographing, video special effects, and AR scenarios. How to perform precise instance segmentation is an urgent technical problem to be resolved.

SUMMARY

Embodiments of this application provide an instance segmentation method and apparatus, to propose an instance segmentation manner.

According to a first aspect, an instance segmentation method is provided. A terminal pre-trains a segmentation network of an instance. After obtaining an original image, the terminal may input the original image into the segmentation network that has been trained. The segmentation network may output at least one feature fusion map corresponding to the original image, and each feature fusion map includes at least one instance. The feature fusion map is used for marking pixels of an instance included in the original image, and any feature fusion map output by the segmentation network may be used for marking pixels of at least one instance included in the feature fusion map.

When training the segmentation network, a sample original image may be input into a to-be-trained segmentation network, where the sample original image is marked with pixels of at least one instance. The to-be-trained segmentation network may perform the following processing on each instance group in the sample original image, where each instance group includes at least one marked instance. The processing includes: predicting at least two different first basic feature maps, and predicting, for each first basic feature map, a first attention feature map corresponding to the first basic feature map. A size of the first attention feature map is the same as that of the first basic feature map, a pixel value of each pixel in the first attention feature map indicates a weight value of a pixel at a corresponding location in the first basic feature map corresponding to the first attention feature map, and there are pixels with different pixel values in the first attention feature map. The to-be-trained segmentation network may perform weighted processing on the at least two first basic feature maps and pixel values of respective first attention feature maps corresponding to the at least two first basic feature maps, to predict a first feature fusion map, and train the to-be-trained segmentation network based on the first feature fusion map and the sample original image.

The first basic feature map and the first attention feature map are extracted from the sample original image with the pixels of the marked instance, to obtain the first feature fusion map, and a segmentation model is trained by using the first feature fusion map and the sample original image. Based on the segmentation model trained in this manner, pixels of an instance in an original image that is subsequently input can be precisely and quickly determined, to implement precise segmentation on the instance in the original image. In addition, there are pixels with different pixel values in an attention feature map. In this way, a weight of each pixel can be considered, and pixels of an instance can be further distinguished accurately.

In a possible implementation, a pixel value of the pixel in the first attention feature map is within a specified value range, for example, 0 to 1, or may be 0 to 0.5, or 0.5 to 1.

In a possible implementation, the sample original image input into the to-be-trained segmentation network may be marked with not only pixels of the instance but also a bounding box, where the bounding box is used for identifying an instance. Generally, one instance is corresponding to one bounding box, and pixels of the instance are located in the bounding box. A segmentation network trained by using a sample original image marked with a bounding box has a capability of marking a bounding box of an instance. In this case, the original image is input into the segmentation network, and the segmentation network outputs a bounding box of an instance included in the original image. For example, coordinates of the bounding box in the original image may be output, or an image with the bounding box may be output. A difference between the image and the original image only lies in whether the bounding box is included. Alternatively, an image with the bounding box and coordinates of the bounding box may be output.

In a possible implementation, the first basic feature map is a basic feature map of a bounding box image corresponding to the instance group. In this case, when the to-be-trained segmentation network is trained based on the first feature fusion map and the sample original image, the to-be-trained segmentation network may be specifically trained based on the first feature fusion map and the bounding box image.

In a possible implementation, a size of an image is preset in the segmentation network. Before the sample original image is input into the to-be-trained segmentation network, the sample original image may be first scaled to the preset size in the segmentation network. In this way, after the segmentation network is trained, and before the original image is input into the segmentation network that has been trained, the original image may be first scaled to the preset size in the segmentation network.

In a possible implementation, a size of an image is preset in the segmentation network, and the segmentation network may adjust the size of the image to reach the preset size. Specifically, in a model training process, a size of the first basic feature map predicted by the to-be-trained segmentation network may be the preset size in the to-be-trained segmentation network. Further, because a size of the first attention feature map is the same as that of the first basic feature map, both the size of the first attention feature map and the size of the first feature fusion map are preset sizes in the to-be-trained segmentation network. To train the segmentation network more precisely, before the to-be-trained segmentation network is trained based on the first feature fusion map and the sample original image, scaling processing may be performed on the size of the first feature fusion map and/or a size of the sample original image, so that the size of the first feature fusion map is the same as the size of the sample original image.

According to a second aspect, a permission management method is provided. A terminal first obtains an original image, and then processes the original image to determine a bounding box of each instance included in the original image. Further, the terminal determines, for each bounding box image, at least two different basic feature maps and an attention feature map corresponding to each basic feature map; and performs weighting processing on the at least two basic feature maps and pixel values of respective attention feature maps corresponding to the at least two basic feature maps, to obtain a feature fusion map corresponding to the bounding box image, where the feature fusion map is used for marking pixels of the instance included in the bounding box. A size of the attention feature map is the same as that of the basic feature map, a pixel value of each pixel in the attention feature map indicates a weight value of a pixel at a corresponding location in the basic feature map corresponding to the attention feature map, and there are pixels with different pixel values in the attention feature map.

Instance segmentation is performed in the foregoing manner of extracting the basic feature map and the attention feature map to obtain the feature fusion map, so that pixels of an instance in the original image can be precisely and quickly determined, to implement precise instance segmentation. In addition, there are pixels with different pixel values in an attention feature map. In this way, a weight of each pixel can be considered, and pixels of an instance can be further distinguished accurately.

According to a third aspect, an instance segmentation apparatus is provided. The instance segmentation has a function of implementing any one of the first aspect and the possible implementations of the first aspect or any one of the second aspect and the possible implementations of the second aspect. The functions may be implemented by hardware, or may be implemented by hardware executing corresponding software. The hardware or the software includes one or more functional modules corresponding to the foregoing function.

According to a fourth aspect, an instance segmentation apparatus is provided. The apparatus may be the terminal in the foregoing method embodiments, or may be a chip disposed in the terminal. The apparatus includes a transceiver and a processor. Optionally, the apparatus further includes a memory. The memory is configured to store a computer program or instructions. The processor is separately coupled to the memory and the transceiver. When the processor executes the computer program or the instructions, the apparatus is enabled to perform, via the transceiver, the method performed by the terminal in any one of the first aspect and the possible implementations of the first aspect, or the method performed by the terminal in any one of the second aspect and the possible implementations of the second aspect.

According to a fifth aspect, a computer program product is provided. The computer program product includes computer program code. When the computer program code is run on a computer, the computer is enabled to perform the method performed by the terminal in any one of the first aspect and the possible implementations of the first aspect or any one of the second aspect and the possible implementations of the second aspect.

According to a sixth aspect, this application provides a chip system. The chip system includes a processor and a memory. The processor and the memory are electrically coupled. The memory is configured to store computer program instructions. The processor is configured to execute some or all of the computer program instructions in the memory. When the some or all of the computer program instructions are executed, the processor is configured to implement a function of the terminal in any one of the first aspect and the possible implementations of the first aspect or any one of the second aspect and the possible implementations of the second aspect.

In a possible design, the chip system may further include a transceiver. The transceiver is configured to send a signal processed by the processor, or receive a signal input to the processor. The chip system may include a chip, or may include a chip and another discrete component.

According to a seventh aspect, a computer-readable storage medium is provided. The computer-readable storage medium stores a computer program. When the computer program is run, the method performed by the terminal in any one of the first aspect and the possible implementations of the first aspect or any one of the second aspect and the possible implementations of the second aspect is performed.

DESCRIPTION OF EMBODIMENTS

The following describes in detail embodiments of this application with reference to accompanying drawings.

Embodiments of this application provide an instance segmentation method and apparatus. The method and the apparatus are based on a same technical concept. Principles by which the method and the apparatus resolve a problem are similar. Therefore, embodiments of the apparatus and the method may be cross-referenced. A repeated part is not described again.

For ease of understanding of embodiments of this application, an application scenario of this application is described below. A service scenario described in embodiments of this application is intended to describe the technical solutions of embodiments of this application more clearly, and does not constitute a limitation on the technical solutions provided in embodiments of this application. It may be learned by a person of ordinary skill in the art that, with emergence of a new service scenario, the technical solutions provided in embodiments of this application are also applicable to a similar technical problem.

Figure 1:
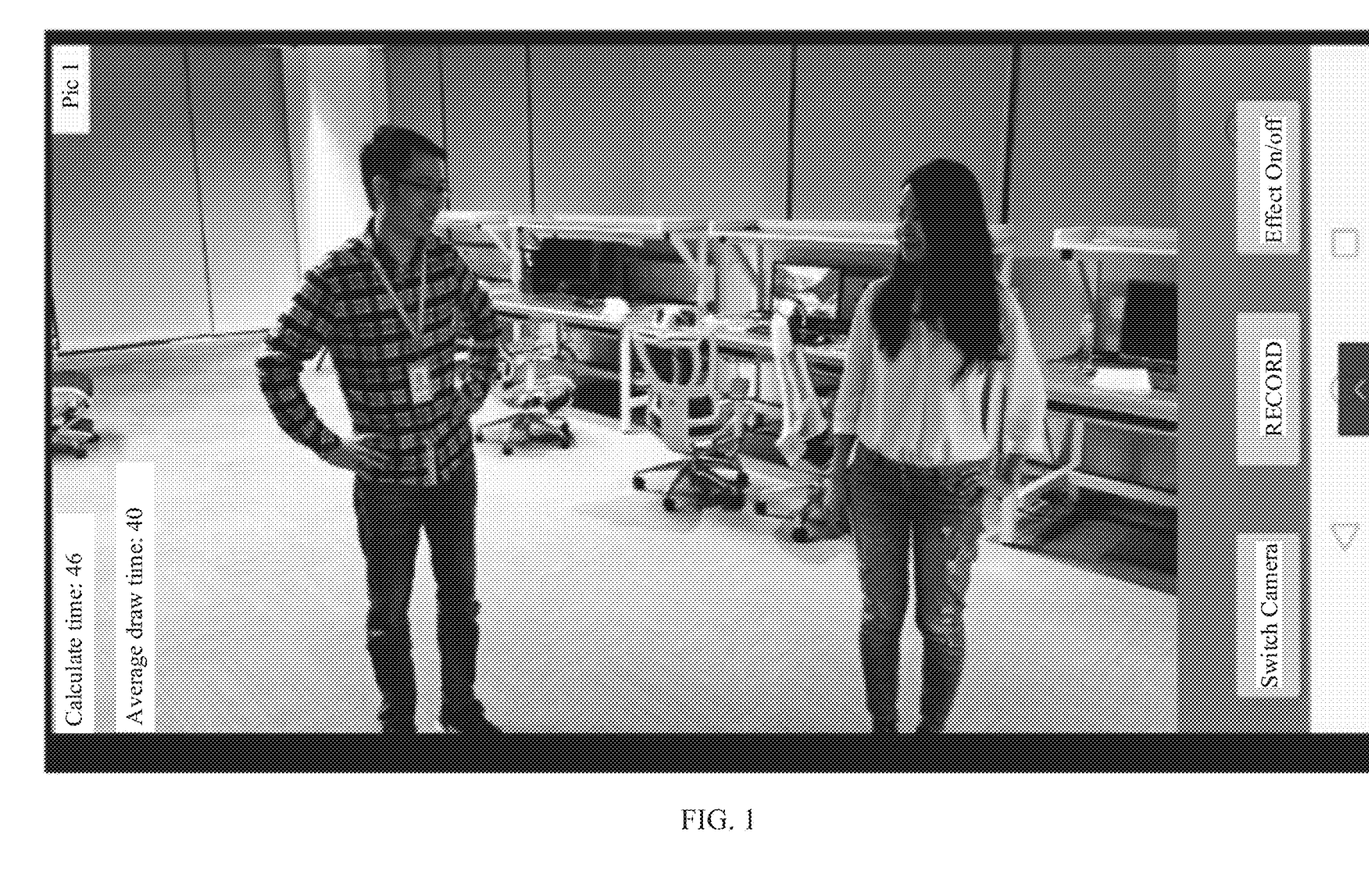
FIG. 1 is a schematic diagram of a scenario of instance segmentation according to an embodiment of this application.

For example, as shown in FIG. 1, a user may photograph, on a device such as a terminal, a picture including a portrait, and the portrait may be considered as an instance in the picture. The user may further perform instance segmentation by using the device such as a terminal, to implement functions such as virtualization and replacement of background other than the portrait. This may be applied to scenarios such as live broadcast production, movie production, and animation production. For example, a main character may be selected, and the background is set to gray. In this way, color of the main character is retained. For another example, the terminal performs instance segmentation on a vehicle on a road surface. In this way, in an autonomous driving process, a vehicle-mounted terminal may assist, based on an instance segmentation result of the vehicle on the road surface, an autonomous system to make a better driving decision.

For ease of understanding embodiments of this application, the following describes some terms in embodiments of this application, to help a person skilled in the art have a better understanding.

(1) A terminal is also referred to as user equipment (user equipment, UE), a mobile station (mobile station, MS), a mobile terminal (mobile terminal, MT), or the like, and is a device that provides voice and/or data connectivity for a user. For example, terminal devices include a handheld device that has a wireless connection function, a vehicle-mounted device, an internet of things device, and the like. Currently, the terminal device may be a mobile phone (mobile phone), a tablet computer, a notebook computer, a palmtop computer, a mobile internet device (mobile interact device, MID), a wearable device, a virtual reality (virtual reality, VR) device, an augmented reality (augmented reality, AR) device, a wireless terminal in industrial control (industrial control), a wireless terminal in self driving (self driving), a wireless terminal in a remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like.

(2) Instance segmentation is a task of identifying an instance contour at a pixel level. A more precise edge of an instance obtained through instance segmentation indicates more refined instance segmentation and a better segmentation effect.

The term "and/or" in this application describes an association relationship for describing associated objects and represents that three relationships may exist. For example, A and/or B may represent the following three cases: Only A exists, both A and B exist, and only B exists. The character "/" usually indicates an "or" relationship between the associated objects.

"A plurality of" in this application means two or more.

In the descriptions of this application, terms such as "first" and "second" are merely used for distinguishing and description, but should not be understood as an indication or implication of relative importance, or should not be understood as an indication or implication of a sequence.

In addition, the term "for example" in embodiments of this application is used to represent giving an example, an illustration, or a description. Any embodiment or implementation solution described as an "example" in this application should not be explained as being more preferred or having more advantages than another embodiment or implementation solution. Specifically, the term "example" is used to present a concept in a specific manner.

Figure 2:
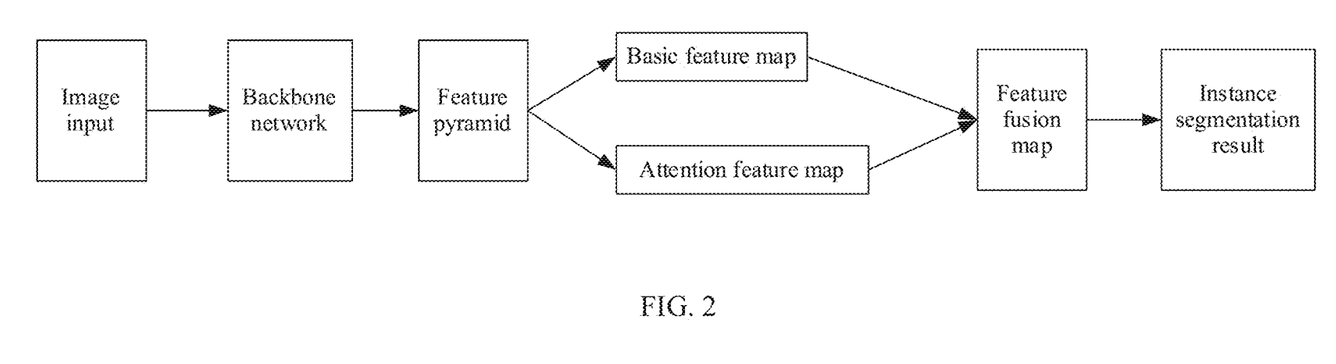
FIG. 2 is a schematic flowchart of instance segmentation according to an embodiment of this application.

FIG. 2 is a schematic flowchart of instance segmentation according to this application.

First, an original image is obtained and is processed, to extract a basic feature map and an attention feature map. Optionally, the original image is first input into a backbone network, and the backbone network obtains images with different resolutions, namely, a feature pyramid. Then, the basic feature map and the attention feature map are extracted based on the feature pyramid. A size of the attention feature map is the same as that of the basic feature map, a pixel value of each pixel in the attention feature map indicates a weight value of a pixel at a corresponding location in the basic feature map corresponding to the attention feature map. Next, weighted fusion is performed on the basic feature map and the attention feature map, to obtain a feature fusion map through instance segmentation. The feature fusion map may represent an instance segmentation result.

The following describes in detail an instance segmentation process in this application.

Figure 3:
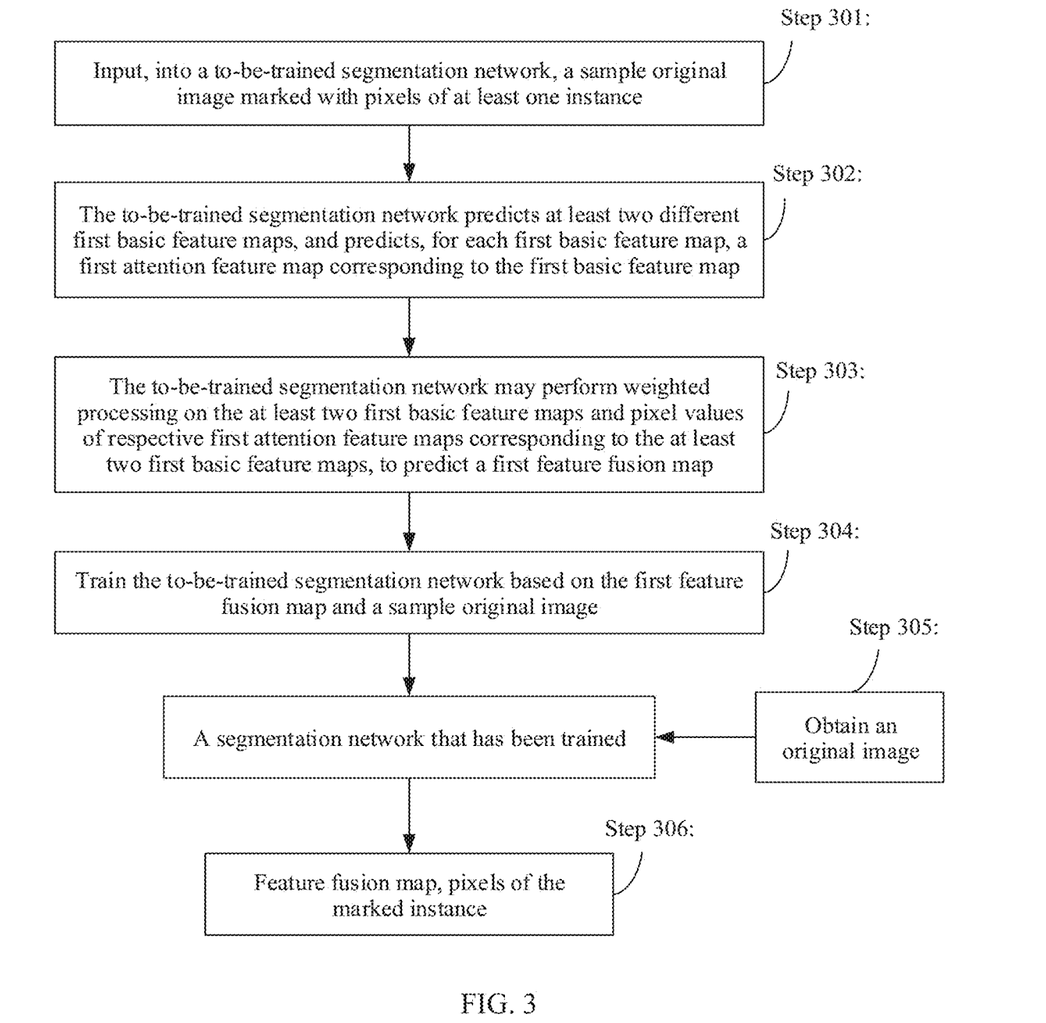
FIG. 3 and FIG. 4 are schematic flowcharts of instance segmentation according to an embodiment of this application.

FIG. 3 provides a schematic flowchart of instance segmentation. In this embodiment, a neural network model used for instance segmentation, referred to as a segmentation network for short, is first trained. Subsequently, instance segmentation is performed by using the segmentation network.

For a specific process of training the segmentation network, refer to the following steps.

Step 301: Input, into a to-be-trained segmentation network, a sample original image marked with pixels of at least one instance.

To train the segmentation network, a user may determine a batch of original images in advance. The original images may be pictures taken by a camera of a terminal or a camera lens, or captured video frames.

The user may mark pixels of an instance on the original image, for example, set pixel values of pixels occupied by the instance and pixels occupied by a background image to different values. An original image in which pixels of an instance are marked by the user may be referred to as a sample original image. If a sample original image includes a plurality of instances, each instance has a different mark. For example, the original image is a picture that is taken by a camera and that includes three persons. A pixel value of the background image other than the three persons may be marked as 0, a pixel value of pixels occupied by a first person may be marked as 2, a pixel value of pixels occupied by a second person may be marked as 4, and a pixel value of pixels occupied by a third person may be marked as 6. If the user mistakenly marks two instances in a same way, the terminal considers the two instances as one instance.

To improve detection performance, a bounding box of an instance may be further marked on the sample original image, and the bounding box is used for identifying an instance. Generally, one instance is corresponding to one bounding box, and pixels occupied by an instance are located in a bounding box corresponding to the instance. Alternatively, there may be one bounding box corresponding to a plurality of instances, and pixels occupied by the plurality of instances are located in the bounding box corresponding to the plurality of instances.

To precisely train the segmentation network, a size of an image may be preset in the segmentation network. Before the sample original image is input into the to-be-trained segmentation network, the sample original image may be first scaled to the preset size in the segmentation network. Certainly, the segmentation network may adjust a size of the input sample original image to reach the preset size.

The to-be-trained segmentation network may perform a processing process of the following step 302 to step 304 on each instance group in the sample original image. Each instance group includes at least one marked instance.

Step 302: The to-be-trained segmentation network predicts at least two different first basic feature maps, and predicts, for each first basic feature map, a first attention feature map corresponding to the first basic feature map.

A size of the first attention feature map is the same as that of the first basic feature map, a pixel value of each pixel in the first attention feature map indicates a weight value of a pixel at a corresponding location in the first basic feature map corresponding to the first attention feature map, and there are pixels with different pixel values in the first attention feature map.

If each instance group includes one marked instance, the instance is corresponding to one feature fusion map. If each instance group includes a plurality of instances, the plurality of instances correspond to one feature fusion map. The first basic feature map may be a basic feature map corresponding to the sample original image, or may be a basic feature map corresponding to a bounding box image corresponding to the instance group.

When predicting the first basic feature map, the to-be-trained segmentation network may perform prediction by using the DeepLabV3+ algorithm. Based on the DeepLabV3+ algorithm, precise basic feature extraction can be performed, to implement a good representation capability for an edge of an instance, for example, a good representation capability for both an edge of a portrait and a body part of the portrait.

Figure 5A:
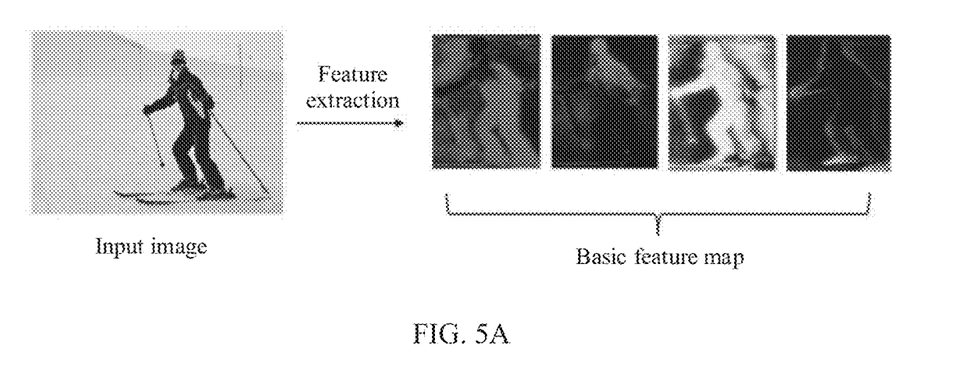
FIG. 5A is a basic feature map according to an embodiment of this application.

One feature fusion map may be determined based on at least two basic feature maps and an attention feature map corresponding to each basic feature map. A quantity of basic feature maps and a quantity of attention feature maps are, for example, 4. As shown in FIG. 5A, an image is input into the segmentation network. The segmentation network performs feature extraction, and outputs four basic feature maps.

A pixel value of the first attention feature map is within a specified value range, for example, 0 to 1, or may be 0 to 0.5, or 0.5 to 1.

A size of an image is preset in the segmentation network. Before the sample original image is input into the to-be-trained segmentation network, the sample original image may be first scaled to the preset size in the segmentation network. Alternatively, the segmentation network may adjust the size of the image to reach the preset size. For example, in a model training process, a size of the first basic feature map predicted by the to-be-trained segmentation network may be a preset size in the to-be-trained segmentation network. Further, because a size of the first attention feature map is the same as that of the first basic feature map, both the size of the first attention feature map and the size of the first feature fusion map are preset sizes in the to-be-trained segmentation network.

The marked sample original image may be first scaled to reach the preset size, or the basic feature map may be scaled to reach the preset size after the basic feature map is extracted.

For example, the preset size of the image in the segmentation network is R*R, and the basic feature map and the attention feature map may be scaled by using the following formulas. A bounding box predicted by the segmentation network includes a predicted instance. The formulas include:

$$r_i = \text{RoIPool}_{R \times R}(B, p_i), \text{ where}$$

B is a basic feature map corresponding to the original image predicted by a bottom module (Bottom Module) in the segmentation network; $p_i$ is coordinates of a bounding box of an $i^{th}$ instance in the original image; and $r_i$ is a basic feature map obtained by mapping the coordinates of the bounding box of the $i^{th}$ instance in the original image to B, extracting a basic feature map in the bounding box, and scaling the basic feature map in the bounding box, where a size of the basic feature map is R*R; and $$a'_i = \text{interpolate}_{M \times M \to R \times R}(a_i), \text{ where}$$

ai is an attention feature map that is of the $i^{th}$ instance and that is predicted by the segmentation network at the beginning, and has a size of M*M. Then, the attention feature map is scaled to a size of R*R, and $a'_i$ is an attention feature map obtained through scaling processing. i is an attention feature map of the $i^{th}$ instance, and is corresponding to the basic feature map $r_i$ of the $i^{th}$ instance.

A pixel value of the attention feature map represents a weight value. The segmentation network may further perform pixel value normalization processing on the attention feature obtained through scaling processing, so that a normalization processed pixel value falls within a specified value range. A normalization formula is as follows:

$s_i = \text{softmax}(a'_i)$, where $s_i$ is a normalization processed attention feature map is performed on the $i^{th}$ instance. The normalization processing may be understood as dividing all pixel values by a same value.

Step 303: The to-be-trained segmentation network may perform weighted processing on the at least two first basic feature maps and pixel values of respective first attention feature maps corresponding to the at least two first basic feature maps, to predict a first feature fusion map.

For details, refer to the following formula:

$m_i = \sum_{t=1}^{k} s_i^t \circ r_i^t$, where $s_i^t$ is a $t^{th}$ normalized attention feature map of the $i^{th}$ instance, $r_i^t$ is a $t^{th}$ basic feature map of the $i^{th}$ instance, and $m_i$ is a feature fusion map corresponding to an $i^{th}$ bounding box image. K is a total quantity of basic feature maps corresponding to one instance (the $i^{th}$ instance). ° represents a point multiplication operation in a matrix. To be specific, point multiplication calculation of a pixel value of a pixel at a corresponding location. The weighted processing is to multiply a pixel value of the first basic feature map by a pixel value of the first attention feature map at a corresponding location, and then add obtained values, to obtain a value, which is a pixel value at a corresponding location in the first feature fusion map.

Figure 5B:
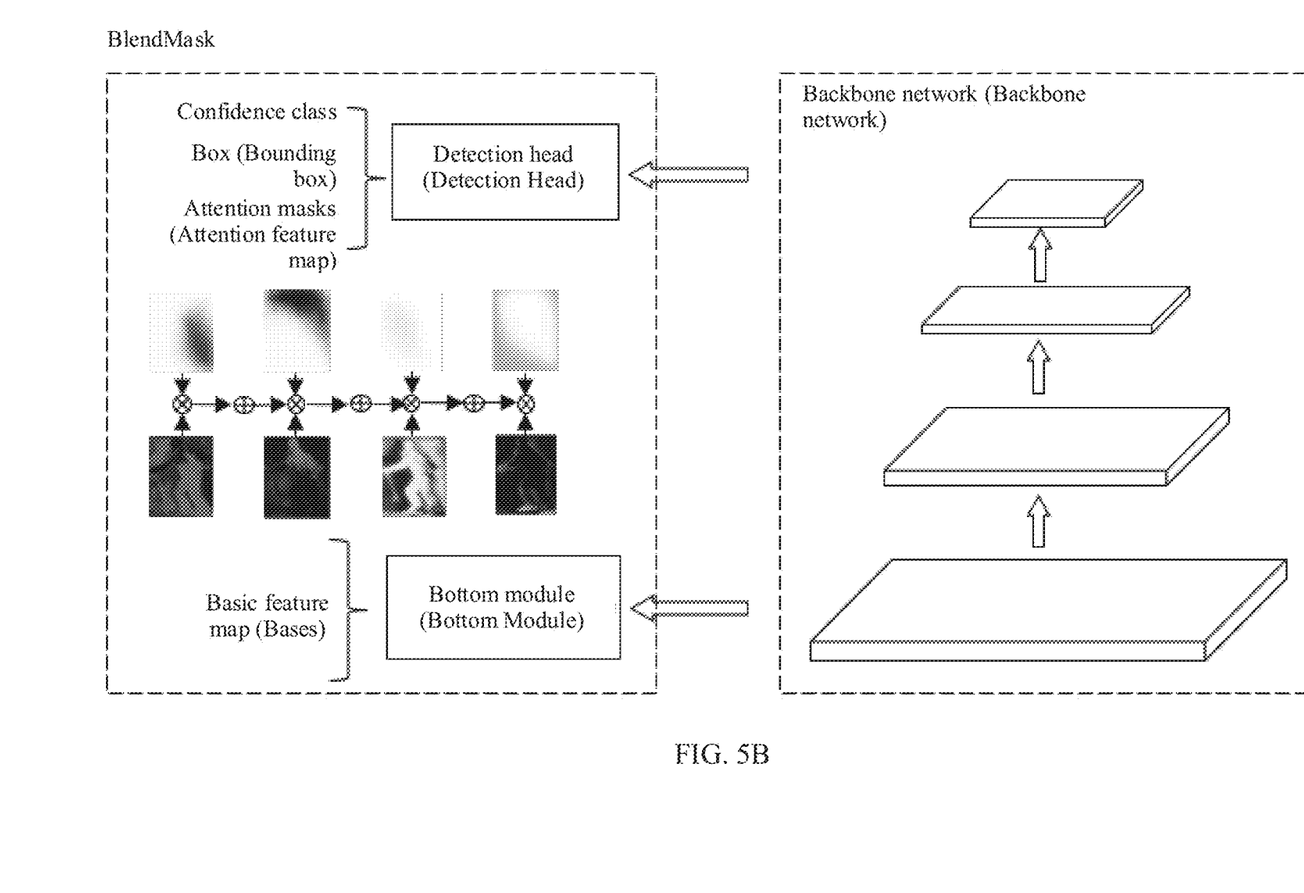
FIG. 5B is a framework diagram of a network model for instance segmentation according to an embodiment of this application.
Figure 5C:
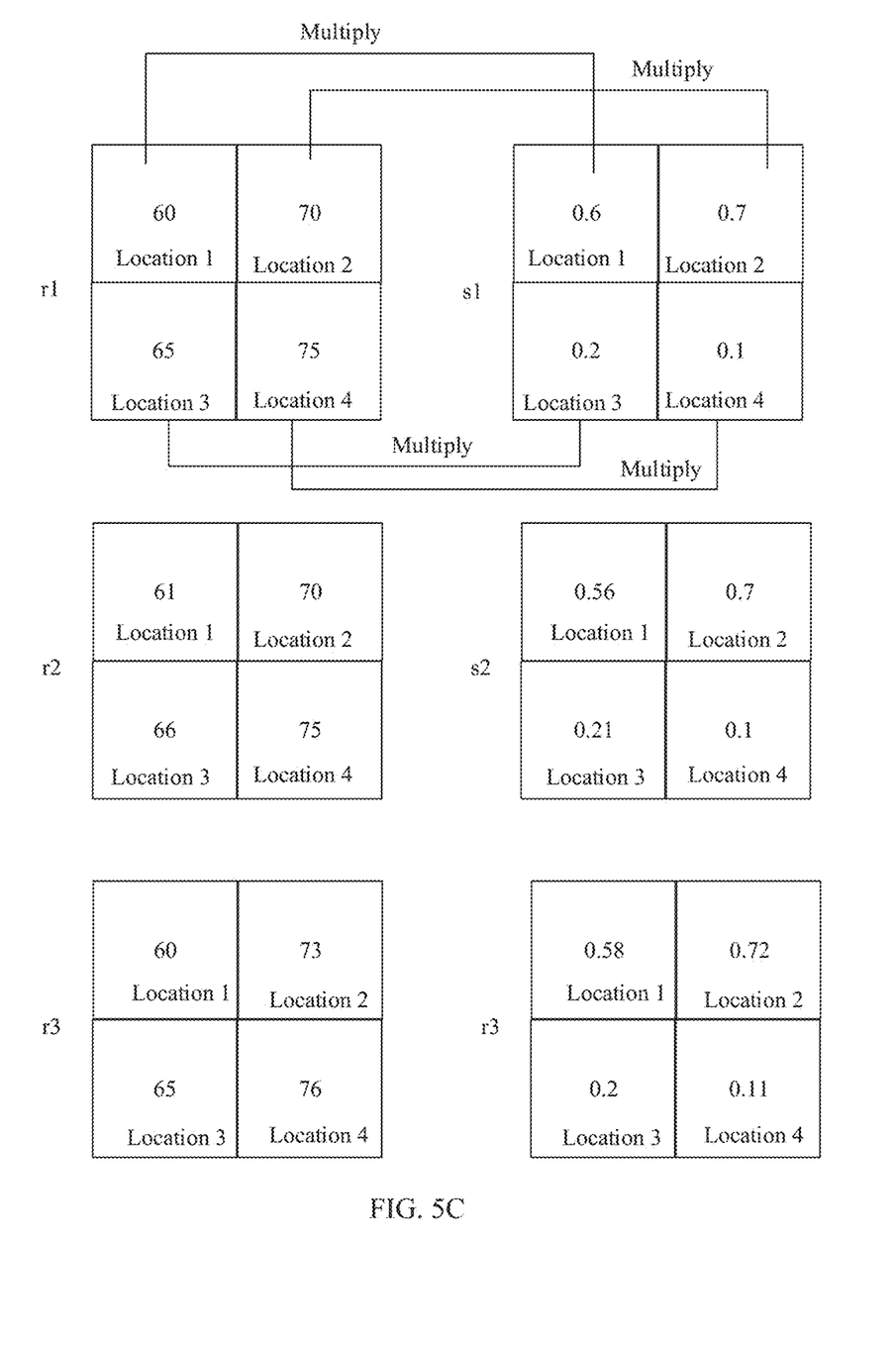
FIG. 5C is an example diagram of weighted processing according to an embodiment of this application.

As shown in FIG. 5C, a schematic diagram of a process of weighting processing is provided. For one instance, three first basic feature maps r1, r2, and r3 whose sizes are 2*2 are extracted, and pixel values of the three first basic feature maps are shown in FIG. 5C. Pixel values of respective first attention feature maps s1, s2, and s3 corresponding to the three first basic feature maps are shown in FIG. 5C. A pixel value at a location 1 in the first feature fusion map is 60*0.6+61*0.56+60*0.58, a pixel value at a location 2 is 70*0.7+70*0. 7+73*0.72, a pixel value at a location 3 is 65*0.2+66*0.21+65*0.2, and a pixel value at a location 4 is 75*0.1+75*0.1+76*0.11.

It should be noted that the predicted first basic feature map and first attention feature map are images without marks.

Step 304: Train the to-be-trained segmentation network based on the first feature fusion map and the sample original image, to obtain a segmentation network that has been trained.

If the first basic feature map is a basic feature map of a bounding box image corresponding to the instance group, when the to-be-trained segmentation network is trained based on the first feature fusion map and the sample original image, the to-be-trained segmentation network may be trained based on the first feature fusion map and the bounding box image.

To train the segmentation network more precisely, before the to-be-trained segmentation network is trained based on the first feature fusion map and the sample original image/bounding box image, scaling processing may be performed on the size of the first feature fusion map anchor a size of the sample original image/bounding box image, so that the size of the first feature fusion map is the same as the size of the sample original image/bounding box image. Alternatively, scaling processing is performed on a size of the sample original image/bounding box image, so that the size of the first feature fusion map is the same as the size of the sample original image/bounding box image. Alternatively, the first feature fusion map and the sample original image (bounding box image) may be simultaneously scaled, so that the first feature fusion map and the sample original image have a same size.

When training is performed by using an instance, the to-be-trained segmentation network may be trained with another instance as a background.

During model training, a large quantity of sample original images are required, to obtain a large quantity of feature fusion maps. The to-be-trained segmentation network compares pixels of an instance extracted from the predicted first feature fusion map with marked pixels of a corresponding instance in the sample original image, calculates a difference, and reversely updates a network parameter by using the obtained difference, so that pixels of an instance extracted by the segmentation network from the sample original image are almost the same as the pixels of the marked instance.

If the sample original image is further marked with the bounding box of the marked instance, the to-be-trained segmentation network may further compare a bounding box extracted from the predicted first feature fusion map with the corresponding marked bounding box in the sample original image, calculate a difference, and reversely update a network parameter by using the obtained difference, so that a bounding box extracted by the segmentation network from the sample original image is almost the same as the marked bounding box. Then, the pixels of the instance are extracted for training.

FIG. 5B shows a network framework of the segmentation network that has been trained. As shown in FIG. 5B, attention masks are predicted in a detection head.

The segmentation network includes a backbone network (backbone network). After an image is input into the backbone network, the backbone network may output a basic feature map and an attention feature map. The detection head is a bounding box head, which is a module that is specially used for prediction and detection of a neural network and that can output a confidence class, namely, a class probability. The class probability may be understood as a probability of an instance in a bounding box predicted by the network. For example, a probability that an instance is a person is 90%, a probability that an instance is a cat is 20%, and a probability that an instance is a dog is 15%. A box is a bounding box predicted by the segmentation network, and may be specifically coordinates of four corners of the bounding box. An additional convolutional layer is added to a detection module of a FCOS network, to predict an attention feature map. In other words, attention masks are attention feature maps predicted by the segmentation network for any bounding box image. A bottom module (bottom module) is a submodule of a BlendMask network and is specially used to predicting basic feature map (bases). The bases are corresponding to the original image. A basic feature map may be subsequently extracted from the bases for feature fusion. A corresponding feature may be extracted from the bases based on a bounding box of each instance.

For a specific process of obtaining an instance segmentation result based on the segmentation network after the segmentation network is trained, refer to the following steps:

Step 305: Obtain an original image.

The original image may be an image that is not processed, for example, a picture taken by a terminal camera or a camera lens, or captured video frames.

Step 306: Input the original image into the segmentation network that has been trained, where the segmentation network may output at least one feature fusion map corresponding to the original image.

Each feature fusion map includes at least one instance. The feature fusion map is used for marking pixels of an instance included in the original image, and any feature fusion map output by the segmentation network may be used for marking pixels of at least one instance included in the feature fusion map. The segmentation network may further output a bounding box of an instance included in the original image. For example, coordinates of the bounding box in the original image may be output, or an image with the bounding box may be output. A difference between the image and the original image only lies in whether the bounding box is included. Alternatively, an image with the bounding box and coordinates of the image may be output.

Certainly, if there is no instance in the original image, a bounding box of an instance is still output.

In an example, before the original image is input into the segmentation network that has been trained, the original image may be first scaled to the preset size in the segmentation network.

The first basic feature map and the first attention feature map are extracted from the sample original image with the pixels of the marked instance, to obtain the first feature fusion map, and a segmentation model is trained by using the first feature fusion map and the sample original image. Based on the segmentation model trained in this manner, pixels of an instance in an original image that is subsequently input can be precisely and quickly determined, to implement precise segmentation on the instance in the original image.

Figure 4:
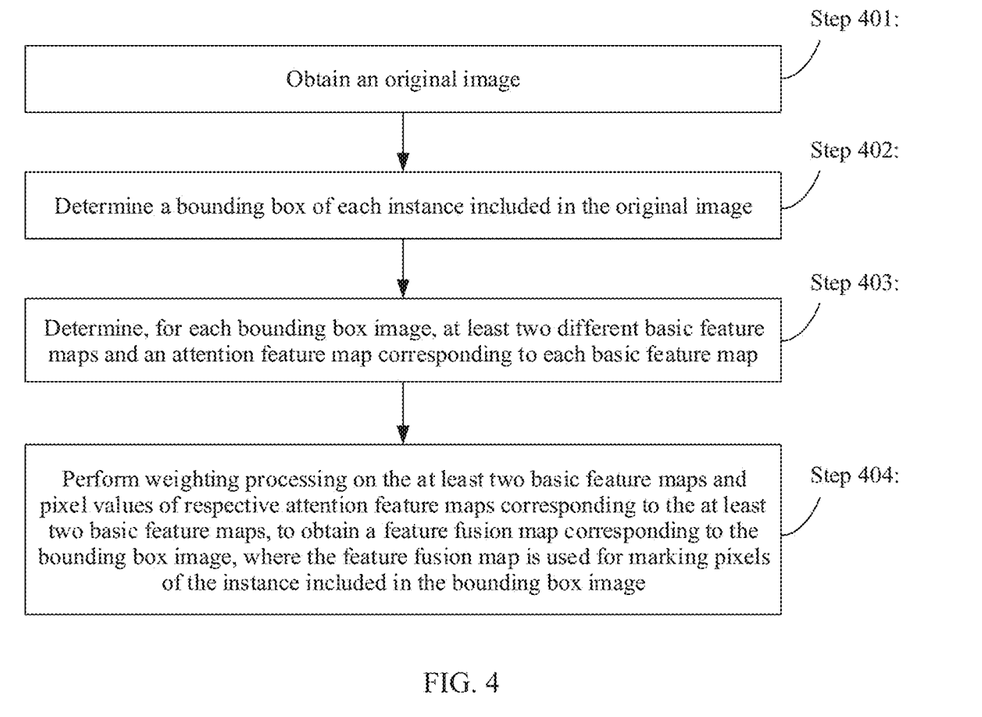

As shown in FIG. 4. another schematic flowchart of instance segmentation is provided.

Step 401: Obtain an original image.

The original image may be a picture or a video frame shot by a camera or a camera lens.

Step 402: Determine a bounding box of each instance included in the original image.

A terminal may receive a bounding box of each instance marked on the original image by a user. Certainly, the terminal may store a network model for predicting a bounding box of an instance. The terminal may input the original image into the network model for predicting a bounding box of an instance, and the network model may output the bounding box of each instance included in the original image. The network model may be an existing network model. Details are not described herein.

Step 403: Determine, for each bounding box image, at least two different basic feature maps and an attention feature map corresponding to each basic feature map.

Step 404: Perform weighting processing on the at least two basic feature maps and pixel values of respective attention feature maps corresponding to the at least two basic feature maps, to obtain a feature fusion map corresponding to the bounding box image, where the feature fusion map is used for marking pixels of the instance included in the bounding box image.

A size of the attention feature map is the same as that of the basic feature map, a pixel value of each pixel in the attention feature map indicates a weight value of a pixel at a corresponding location in the basic feature map corresponding to the attention feature map, and there are pixels with different pixel values in the attention feature map.

The terminal may extract the basic feature map by using a DeepLabV3+ algorithm, or may extract the attention feature map by using an algorithm.

Alternatively, a bounding box image may be input into a pre-trained segmentation network, which may be the segmentation network described above. The segmentation network outputs at least two basic feature maps and respective attention feature maps corresponding to the at least two basic feature maps. Then, the terminal may perform weighted processing on pixel values of the basic feature map and pixel values of the attention feature map, to obtain a corresponding feature fusion map.

The foregoing describes the instance segmentation method in embodiments of this application, and the following describes an instance segmentation apparatus in embodiments of this application.

Figure 6:
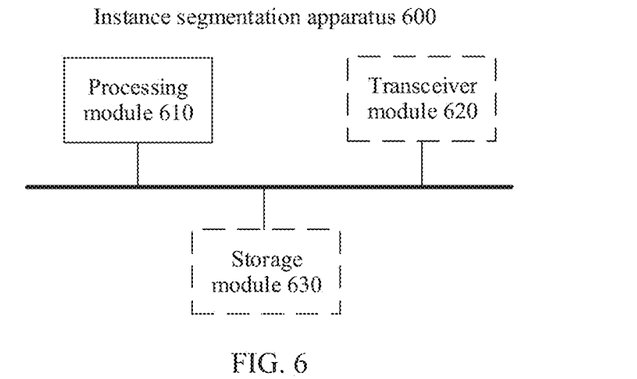
FIG. 6 and FIG. 7 are schematic diagrams of structures of instance segmentation apparatuses according to an embodiment of this application.

Based on a same technical idea as the foregoing instance segmentation method, as shown in FIG. 6, an instance segmentation apparatus 600 is provided. The apparatus 600 can perform the steps performed by the terminal in the methods in FIG. 3 and FIG. 4. To avoid redundancy, details are not described herein again. The apparatus 600 may be a terminal, or may be a chip applied to a terminal. The apparatus 600 may include a processing module 610, and optionally, further include a transceiver module 620 and a storage module 630. The processing module 610 may be separately connected to the storage module 630 and the transceiver module 620, or the storage module 630 may be connected to the transceiver module 620.

The transceiver module 620 may be configured to receive an original image.

The storage module 630 may be configured to store the original image and store a segmentation network.

In an implementation, the processing module 610 is configured to: obtain the original image, and input the original image into a segmentation network that has been trained, to obtain at least one feature fusion map corresponding to the original image, where the feature fusion map is used for marking pixels of an instance included in the original image, and each feature fusion map includes at least one instance.

The processing module 610 is further configured to train the segmentation network in the following manner:

The to-be-trained segmentation network performs the following processing on each instance group that is in a sample original image and that is of pixels of a marked instance, where each instance group includes at least one marked instance, and the processing includes:

predicting at least two different first basic feature maps and a first attention feature map corresponding to each first basic feature map; performing weighted processing on the at least two first basic feature maps and pixel values of respective first attention feature maps corresponding to the at least two first basic feature maps, to predict a first feature fusion map; and training the to-be-trained segmentation network based on the first feature fusion map and the sample original image.

A size of the first attention feature map is the same as that of the first basic feature map, a pixel value of each pixel in the first attention feature map indicates a weight value of a pixel at a corresponding location in the first basic feature map corresponding to the first attention feature map, and there are pixels with different pixel values in the first attention feature map.

In an implementation, the processing module 610 is further configured to obtain a bounding box of the instance included in the original image.

In an implementation, the processing module 610 is further configured to: before the original image is input into the segmentation network that has been trained, scale the original image to a preset size in the segmentation network.

In an implementation, the processing module 610 is further configured to: before training the to-be-trained segmentation network based on the first feature fusion map and the sample original image, perform scaling processing on the size of the first feature fusion map and/or a size of the sample original image, so that the size of the first feature fusion map is the same as the size of the sample original image.

In an implementation, the processing module 610 is configured to: obtain an original image; determine a bounding box of each instance included in the original image; determine, for each bounding box image, at least two different basic feature maps and an attention feature map corresponding to each basic feature map; and perform weighting processing on the at least two basic feature maps and pixel values of respective attention feature maps corresponding to the at least two basic feature maps, to obtain a feature fusion map corresponding to the bounding box image, where the feature fusion map is used for marking pixels of the instance included in the bounding box image.

A size of the attention feature map is the same as that of the basic feature map, a pixel value of each pixel in the attention feature map indicates a weight value of a pixel at a corresponding location in the basic feature map corresponding to the attention feature map, and there are pixels with different pixel values in the attention feature map.

Figure 7:
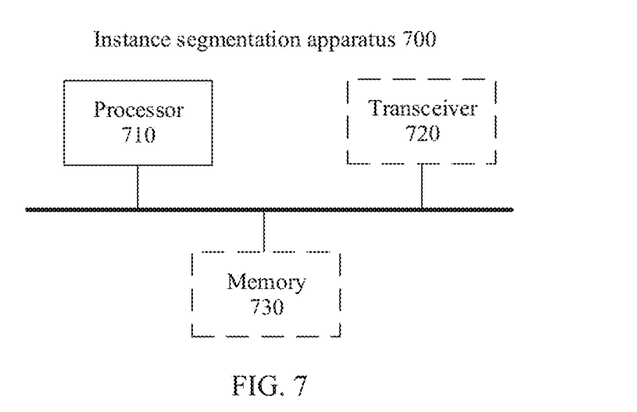

FIG. 7 is a schematic block diagram of an instance segmentation apparatus 700 according to an embodiment of this application. It should be understood that the apparatus 700 can perform steps performed by the terminal in the methods in FIG. 3 and FIG. 4. To avoid redundancy, details are not described herein again. The apparatus 700 includes a processor 710, and optionally, further includes a memory

730 and a transceiver 720. The processor 710 and the memory 730 are electrically coupled.

For example, the memory 730 is configured to store a computer program. The processor 710 may be configured to invoke the computer program or instructions stored in the memory, to perform the foregoing instance segmentation method via the transceiver 720.

In FIG. 6, the processing module 610 may be implemented by the processor 710, the transceiver module 620 may be implemented by the transceiver 720, and the storage module 630 may be implemented by the memory 730.

The foregoing processor may be a central processing unit (central processing unit, CPU), a network processor (network processor, NP) or a combination of a CPU and an NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), general array logic (generic array logic, GAL) and another programmable logic device, a discrete gate or transistor logic device, a discrete hardware component, or any combination thereof. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application aims to include but is not limited to these memories and any memory of another proper type.

An embodiment of this application further provides a computer storage medium. The computer storage medium stores a computer program. When the computer program is executed by a computer, the computer is enabled to perform the foregoing instance segmentation method.

An embodiment of this application further provides a computer program product including instructions. When the computer program product runs on a computer, the computer is enabled to perform the foregoing instance segmentation method.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although some preferred embodiments of this application have been described, a person skilled in the art can make changes and modifications to these embodiments once the person skilled in the art learns of the basic inventive concept. Therefore, the following claims are intended to be construed as to cover the preferred embodiments and all changes and modifications falling within the scope of this application.

Clearly, persons skilled in the art can make various modifications and variations to embodiments of this application without departing from the spirit and scope of embodiments of this application. This application is also intended to cover these modifications and variations to embodiments of this application provided that the modifications and variations fall within the scope of protection defined by the following claims and their equivalent technologies.

What is claimed is:

1. An instance segmentation method, wherein the method comprises:
    obtaining an original image; and
    inputting the original image into a segmentation network that has been trained; and obtaining at least one feature fusion map corresponding to the original image, wherein the at least one feature fusion map is used for marking pixels of an instance comprised in the original image, and each feature fusion map comprises at least one instance, wherein the segmentation network is trained by operations comprising:

for each instance group that is in a sample original image, wherein the each instance group comprises at least one marked instance, performing, by a to-be-trained segmentation network, processing comprising:

predicting at least two different first basic feature maps and a first attention feature map corresponding to each of the at least two different basic feature maps;

performing weighted processing on the at least two first basic feature maps and pixel values of respective first attention feature maps corresponding to the at least two first basic feature maps, to predict a first feature fusion map; and training the to-be-trained segmentation network based on the first feature fusion map and the sample original image, wherein:

a size of the first attention feature map is the same as that of the first basic feature map corresponding to the first attention feature map, a pixel value of each pixel in the first attention feature map indicates a weight value of a pixel at a corresponding location in the first basic feature map corresponding to the first attention feature map, and there are pixels with different pixel values in the first attention feature map.

2. The method according to claim 1, wherein a value range of the pixel value of the first attention feature map is 0 to 1.

3. The method according to claim 1, wherein the sample original image is further marked with a bounding box, and the bounding box is used for identifying an instance; and when the at least one feature fusion map corresponding to the original image is obtained, the method further comprises:

obtaining a bounding box of the instance comprised in the original image.

4. The method according to claim 3, wherein the first basic feature map is a basic feature map of a bounding box image corresponding to the instance group; and the training the to-be-trained segmentation network based on the first feature fusion map and the sample original image comprises:

training the to-be-trained segmentation network based on the first feature fusion map and the bounding box image.

5. The method according to claim 1, wherein before the inputting the original image into a segmentation network that has been trained, the method further comprises:

scaling the original image to a preset size in the segmentation network.

6. The method according to claim 1, wherein the size of the first basic feature map, the size of the first attention feature map, and a size of the first feature fusion map are all preset sizes in the to-be-trained segmentation network;

before the training the to-be-trained segmentation network based on the first feature fusion map and the sample original image, the method further comprises:

performing scaling processing on the size of the first feature fusion map and/or a size of the sample original image, to enable the size of the first feature fusion map to be the same as the size of the sample original image.

7. An instance segmentation apparatus, comprising at least one processor;

one or more memories coupled to the at least one processor and storing programming instructions for execution by the at least one processor to perform a method comprising:

obtaining an original image;

inputting the original image into a segmentation network that has been trained; and obtaining at least one feature fusion map corresponding to the original image, wherein the feature fusion map is used for marking pixels of an instance comprised in the original image, and each feature fusion map comprises at least one instance, wherein the segmentation network is trained by operations comprising for each instance group that is in a sample original image and that is of pixels of a marked instance, wherein each instance group comprises at least one marked instance, performing, by a to-be-trained segmentation network, the following processing comprising:

predicting at least two different first basic feature maps and a first attention feature map corresponding to each of the at least two different first basic feature map;

performing weighted processing on the at least two first basic feature maps and pixel values of respective first attention feature maps corresponding to the at least two first basic feature maps corresponding to the at least two first basic feature maps, to predict a first feature fusion map; and training the to-be-trained segmentation network based on the first feature fusion map and the sample original image, wherein a size of the first attention feature map is the same as that of the first basic feature map, a pixel value of each pixel in the first attention feature map indicates a weight value of a pixel at a corresponding location in the first basic feature map corresponding to the first attention feature map, and there are pixels with different pixel values in the first attention feature map.

8. The apparatus according to claim 7, wherein a value range of the pixel value of the first attention feature map is 0 to 1.

9. The apparatus according to claim 7, wherein the sample original image is further marked with a bounding box, and the bounding box is used for identifying an instance; and when the at least one feature fusion map corresponding to the original image is obtained, the method further comprises:

obtaining a bounding box of the instance comprised in the original image.

10. The apparatus according to claim 9, wherein the first basic feature map is a basic feature map of a bounding box image corresponding to the instance group; and the training the to-be-trained segmentation network based on the first feature fusion map and the sample original image comprises:

training the to-be-trained segmentation network based on the first feature fusion map and the bounding box image.

11. The apparatus according to claim 7, wherein before the inputting the original image into a segmentation network that has been trained, the method further comprises:

scaling the original image to a preset size in the segmentation network.

12. The apparatus according to claim 7, wherein the size of the first basic feature map, the size of the first attention feature map, and a size of the first feature fusion map are all preset sizes in the to-be-trained segmentation network;
before the training the to-be-trained segmentation network based on the first feature fusion map and the sample original image, the method further comprises:
performing scaling processing on the size of the first feature fusion map and/or a size of the sample original image, to enable the size of the first feature fusion map to be the same as the size of the sample original image.

13. A non-transitory computer-readable storage medium, wherein the non-transitory computer-readable storage medium stores computer instructions; and when the computer instructions are executed by a computer, the computer is enabled to perform method comprising:
obtaining an original image;
inputting the original image into a segmentation network that has been trained, and
obtaining at least one feature fusion map corresponding to the original image, wherein the feature fusion map is used for marking pixels of an instance comprised in the original image, and each feature fusion map comprises at least one instance, wherein
the segmentation network is trained by operations comprising:
for each instance group that is in a sample original image, wherein each instance group comprises at least one marked instance, performing, by a to-be-trained segmentation network, processing comprising:
predicting at least two different first basic feature maps and a first attention feature map corresponding to each of the at least two different first basic feature maps;
performing weighted processing on the at least two first basic feature map and pixel values of respective first attention feature maps corresponding to the at least two first basic feature maps, to predict a first feature fusion map;and
training the to-be-trained segmentation network based on the first feature fusion map and the sample original image, wherein
a size of the first attention feature map is the same as that of the first basic feature map corresponding to the first attention feature map, a pixel of each pixel in the first attention feature map indicates a weight value of a pixel at a corresponding location in the first basic feature map corresponding to the first attention feature map, and there are pixels with different pixel values in the first attention feature map.

14. The non-transitory computer-readable storage medium according to claim 13, wherein a value range of the pixel value of the first attention feature map is 0 to 1.

15. The non-transitory computer-readable storage medium according to claim 13, wherein the sample original image is further marked with a bounding box, and the bounding box is used for identifying an instance; and
when the at least one feature fusion map corresponding to the original image is obtained, the method further comprises:
obtaining a bounding box of the instance comprised in the original image.

16. The non-transitory computer-readable storage medium according to claim 15, wherein the first basic feature map is a basic feature map of a bounding box image corresponding to the instance group; and
the training the to-be-trained segmentation network based on the first feature fusion map and the sample original image comprises:
training the to-be-trained segmentation network based on the first feature fusion map and the bounding box image.

17. The non-transitory computer-readable storage medium according to claim 13, wherein before the inputting the original image into a segmentation network that has been trained, the method further comprises:
scaling the original image to a preset size in the segmentation network.

18. The non-transitory computer-readable storage medium according to claim 13, wherein the size of the first basic feature map, the size of the first attention feature map, and a size of the first feature fusion map are all preset sizes in the to-be-trained segmentation network;
before the training the to-be-trained segmentation network based on the first feature fusion map and the sample original image, the method further comprises:
performing scaling processing on at least one of the size of the first feature fusion map or a size of the sample original image, to enable the size of the first feature fusion map to be the same as the size of the sample original image.

* * * * *

UNITED STATES PATENT AND TRADEMARK OFFICE
CERTIFICATE OF CORRECTION

| | | |
|---|---|---|
| PATENT NO. | : 12,254,636 B2 | Page 1 of 2 |
| APPLICATION NO. | : 17/853799 | |
| DATED | : March 18, 2025 | |
| INVENTOR(S) | : Kunyang Sun et al. | |

It is certified that error appears in the above-identified patent and that said Letters Patent is hereby corrected as shown below:

On the Title Page

In Column 2 (Item (57) Abstract), In Line 4-5, Delete "and that is of pixels of a marked instance," and insert -- , --.

In Column 2 (Item (57) Abstract), In Line 6, Delete "instance, and the" and insert -- instance. The --.

In Column 2 (Item (57) Abstract), In Line 15-16, After "image." delete "A segmentation model can precisely determine pixels of an instance in an original image.".

In the Claims

In Column 14, In Line 65, In Claim 1, delete "image;" and insert -- image comprising an instance; --.

In Column 15, In Line 3, In Claim 1, delete "an" and insert -- the --.

In Column 15, In Line 14, In Claim 1, after "different" insert -- first --.

In Column 15, In Line 24, In Claim 1, delete "the" and insert -- a --.

In Column 15, In Line 64, In Claim 6, after "on" insert -- at least one of --.

In Column 15, In Line 65, In Claim 6, delete "and/or" and insert -- or --.

In Column 16, In Line 15-16, In Claim 7, after "comprising" insert -- : --.

In Column 16, In Line 24, In Claim 7, delete "map;" and insert -- maps; --.

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,254,636 B2

In Column 16, In Line 27-28, In Claim 7, after "maps" delete "corresponding to the at least two first basic feature maps".

In Column 16, In Line 33, In Claim 7, after "wherein" insert -- : --.

In Column 16, In Line 35, In Claim 7, after "of" insert -- a first basic feature map corresponding to --.

In Column 16, In Line 35, In Claim 7, delete "basic" and insert -- attention --.

In Column 17, In Line 6, In Claim 12, after "on" insert -- at least one of --.

In Column 17, In Line 7, In Claim 12, delete "and/or" and insert -- or --.

In Column 17, In Line 17, In Claim 13, delete "trained," and insert -- trained; --.

In Column 17, In Line 34 (Approx.), In Claim 13, delete "map" and insert -- maps --.

In Column 17, In Line 37 (Approx.), In Claim 13, delete "map;and" and insert -- map; and --.

In Column 17, In Line 40, In Claim 13, after "wherein" insert -- : --.

In Column 17, In Line 42, In Claim 13, delete "the" and insert -- a --.

In Column 17, In Line 43, In Claim 13, after "pixel" insert -- value --.